UNITED STATES PATENT OFFICE.

RICHARD KIRCHHOFF, OF BERLIN, GERMANY, ASSIGNOR TO THE ACTIEN-GESELLSCHAFT FÜR ANILIN FABRIKATION, OF SAME PLACE.

BLACK DYE.

SPECIFICATION forming part of Letters Patent No. 516,604, dated March 13, 1894.

Application filed October 14, 1893. Serial No. 488,141. (Specimens.)

*To all whom it may concern:*

Be it known that I, RICHARD KIRCHHOFF, a subject of the Emperor of Germany, residing in Berlin, in the Kingdom of Prussia, German Empire, have invented new and useful Improvements in the Production of a Black Dye; and I do hereby declare that the following is a full, clear, and exact description of the invention, which will enable others skilled in the art to which it appertains to make and use the same.

This invention relates to the manufacture of a black tetrazo dye stuff capable of directly dyeing unmordanted cotton.

Hitherto the dyeing of deep black shades on unmordanted cotton by means of the so-called substantive dyes—as for instance diamin black, nyanza black, tabora black and the like—could only be effected by rediazotizing these substances on the fiber and afterward developing with certain amins or phenols and the like.

Now I have discovered a new tetrazo dye, which in tinctorial power greatly surpasses the above mentioned substances.

In dyeing cotton with this new coloring matter, it is possible to obtain a deep black shade directly in a single bath without diazotation or development which always render the dyeing process more complex.

The following example will show the manner in which I may practically carry out my invention. 21.2 kilos ortho-tolidin are converted in the well known manner into tetrazoditolyl salt. The tetrazo compound obtained is poured into a solution of thirty-two kilos of the amido oxynaphthalendisulfonic acid described in United States Letters Patent No. 458,286, dated August 25, 1891, and thirty kilos sodium carbonate. As soon as the formation of the intermediate product is completed, ninety kilos hydrochloric acid of 20° Baumé are added and the product is rediazotized by means of seven kilos sodium nitrite. The new tetrazo compound obtained is allowed to run into a solution containing thirty kilos meta-toluylendiamin and thirty kilos sodium carbonate. After stirring for some hours the solution is boiled and the dye-stuff is precipitated by the addition of common salt, filtered off, pressed and dried. It forms an amorphous dark brown powder, readily soluble in water with dark brown violet color, which is not changed by the addition of alkalies; in this solution concentrated caustic soda-lye produces a brown black precipitate, while on the addition of mineral acids or acetic acid the free color acid is precipitated in the form of black violet flakes.

The dye is only sparingly soluble in alcohol with black violet color, insoluble in ether; in concentrated sulfuric acid it dissolves with indigo blue color, diluting with water this solution turns at first into black-violet and then the color-acid separates in the shape of dark violet flakes.

The coloring matter produced in this way dyes unmordanted cotton in a soap or salt bath a deep black color. It is distinguished by remarkable fastness against acids and alkalies.

The following alterations may be made in the above example without materially changing the character of the product obtained. Instead of tolidin the equivalent quantity of any other para-diamin capable of forming direct dyeing coloring matters can be used, and for the meta-toluylendiamin may be substituted meta-phenylenediamin or resorcin.

Having thus described my invention and in what manner it can be performed, that which I claim as new, and desire to secure by Letters Patent, is—

1. The process for the production of a new direct dyeing coloring matter by combining one molecular proportion of tetrazoorthoditolyl salt with one molecular proportion of the amido-oxynaphthalendisulfonic acid described in United States Letters Patent No. 458,286, by further diazotizing the resulting intermediate product and coupling the tetrazo compound thus obtained with two molecular proportions of meta-toluylendiamin.

2. The new black dyestuff derived from tetrazoditolyl and amido-oxynaphthalen di-sulfo-acid which is readily soluble in water, sparingly soluble in alcohol insoluble in ether; the dark brown-violet color of the aqueous solution is not altered on addition of alkalies; in the aqueous solution of the dye concentrated caustic soda lye produces a brown-black precipitate, while on the addition of mineral acids or acetic acid the color acid is separated in the form of a black violet precipitate; in concentrated sulfuric acid it dissolves with indigo blue color, which on diluting with water changes at first into black-violet and from which solution on further diluting the color-acid separates in the shape of dark violet flakes; it dyes unmordanted cotton in a salt or alkaline bath a deep black shade.

In testimony whereof I hereunto set my hand and affix my seal, in the presence of two witnesses, this 27th day of September, A. D. 1893.

RICHARD KIRCHHOFF. [L. S.]

Witnesses:
OSCAR WEBER,
GUSTAV LUCHT.